United States Patent [19]

Wetzel

[11] Patent Number: 4,949,070
[45] Date of Patent: Aug. 14, 1990

[54] LOCOMOTIVE LUBRICATION LEVEL MONITOR

[76] Inventor: Donald C. Wetzel, Berea, Ohio

[21] Appl. No.: 298,680

[22] Filed: Jan. 19, 1989

[51] Int. Cl.$^5$ ............................................... B60Q 1/00
[52] U.S. Cl. ................................. 340/450.3; 340/450; 340/612; 340/618; 184/108; 200/190; 73/303
[58] Field of Search ...................... 340/450.3, 450, 612, 340/618, 450.1, 450.2; 200/184, 182, 190, 186; 184/6.4, 108, 103.1, 109, 103.2; 73/290 R, 293, 294, 303

[56] References Cited

U.S. PATENT DOCUMENTS

| | | | |
|---|---|---|---|
| 2,728,070 | 12/1955 | Kelly | 73/303 |
| 3,333,259 | 7/1967 | Carothers, Jr. | 340/450.3 |
| 4,192,186 | 3/1980 | Quinn | 73/303 |
| 4,480,610 | 11/1984 | Stinson | 184/6.4 |
| 4,491,103 | 1/1985 | Deadman | 184/103.2 |
| 4,549,164 | 10/1985 | Tewfik | 73/303 |
| 4,791,400 | 12/1988 | Burks et al. | 116/227 |

*Primary Examiner*—Donnie L. Crosland
*Attorney, Agent, or Firm*—Pearne, Gordon, McCoy & Granger

[57] ABSTRACT

A lubricant level monitor for gear covers of locomotives uses a vacuum probe tube to determine if the lubricant is below a predetermined level. The vacuum is only activated if the locomotive has been at rest for a predetermined period of time, so that the lubricant has time to settle. The monitor employs a minimal amount of electrical devices and uses pneumatic logic wherever possible insure trouble-free operation. The monitor eliminates the requirement of inspection personnel going beneath the locomotive, and it eliminates the need for the locomotive to be arbitrarily pit-inspected every two weeks for a lubricant level check.

12 Claims, 2 Drawing Sheets

LOCOMOTIVE LUBRICATION LEVEL MONITOR

BACKGROUND OF THE INVENTION

1. Field of the Invention

This invention relates to railroad locomotives having gear covers, and in particular to those locomotives which use the gear covers as a lubricant reservoir.

2. Description of the Prior Art

In railroad diesel locomotives, the lubricant for traction motor and wheel axle gears is contained in the gear covers which form a reservoir for this lubricant. Diesel locomotive trucks are subjected to extremes of temperature, shock, vibration, rain, snow, and other hostile conditions. Due to the severe environment in which diesel locomotive trucks operate, traction motor/wheel axle gear covers often leak. The resulting loss of lubricant will cause a catastrophic failure of the gears.

At the present time, this problem is dealt with by periodic inspection of lubricant in the gear covers. Most railroads inspect the gear covers approximately once every two weeks. If a leak is detected, the leak is sealed, and the lubricant is replenished. If the leak is severe, the entire gear cover will be replaced, and the lubricant refilled. In order to perform this inspection, the locomotives must be taken out of service and placed over a track pit to allow for a visual inspection of the lubricant level in the gear covers. Pit inspection is necessary to reduce the chances of accidents and harm to the railroad personnel. Such inspections are costly to the railroads, both in labor and in amount of time that the locomotive must be taken out of service during inspection.

SUMMARY OF THE INVENTION

The present invention overcomes the problems of the prior art by providing a means for inspecting the lubricant level in the gear covers quickly, easily and accurately without taking the locomotive out of service and without the use of expensive and time-consuming pit inspection. The present invention eliminates the requirement of inspection personnel going beneath the locomotive to check the lubricant level, and it eliminates the need for locomotives to be arbitrarily pit-inspected every two weeks for a lubricant level check.

In accordance with the present invention, the lubricant level may be routinely checked quickly and easily. The present invention provides automatic or manual measurement of the level of the lubricant in less than 30 seconds whenever the locomotive has remained stationary for at least 10 minutes, and provides for such measurement each 10 minutes thereafter as long as the locomotive does not move.

The gear cover lubricant level monitor of the present invention employs a minimal amount of electrical devices and uses pneumatic logic wherever possible insure trouble-free operation. The monitor measures the lubricant level of all gear covers of a particular locomotive and produces an alarm if a low lubricant condition exists in one or more of the gear covers.

These and other advantages are achieved by the lubricant level monitor of the present invention for monitoring the lubricant level in the gear covers of locomotives. The monitor comprises a motion sensor for determining if the locomotive is moving. A timer is connected to the motion sensor for determining if the locomotive has been at rest for a predetermined period of time. A probe tube extends into the gear cover. The probe tube has an open lower end. The lower end of the tube is adapted to be positioned at the low lubricant level and to be covered with lubricant if the lubricant level is at or above the low lubricant level. A vacuum source is connected to the probe tube for drawing a vacuum in the probe tube. The vacuum source is enabled by the timer to attempt to draw a vacuum only if the locomotive has been at rest for the predetermined period. A vacuum sensor determines if there indeed is a partial vacuum created in the probe tube, indicating that the lubricant level is above the lower open end of the tube and that the lower end of the tube is effectively sealed.

DETAILED DESCRIPTION OF THE PREFERRED EMBODIMENT

Figure 1:
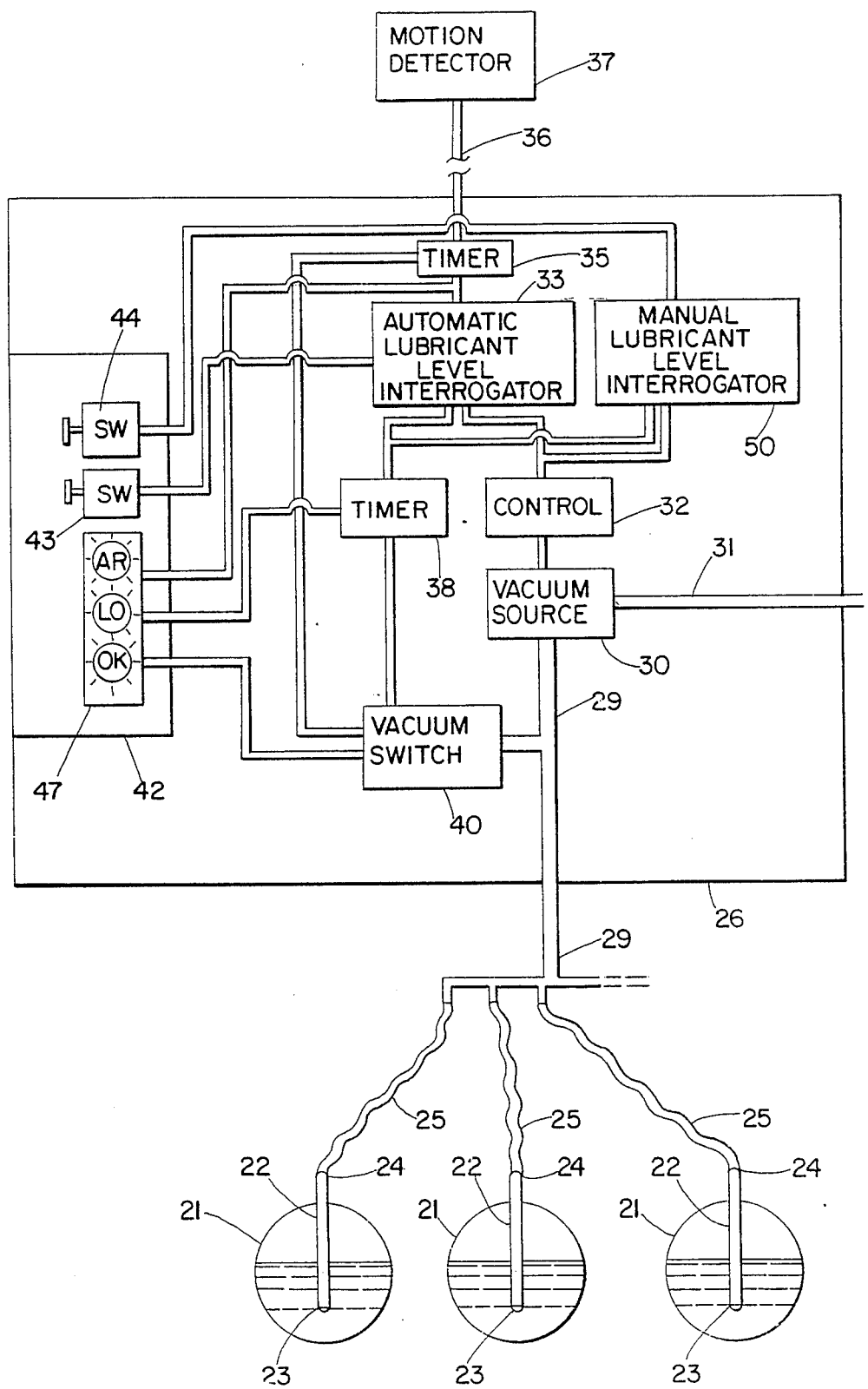
FIG. 1 is a schematic drawing of the lubricant level monitor of the present invention.

Referring more particularly to the drawings, and initially to FIG. 1, there is shown the lubricant level monitor of the present invention.

In railroad locomotives, power is transmitted from the traction motor to the wheel axles through a traction motor gear/axle gear assembly. The traction motor gear/axle gear assembly is shaped to generally conform to the smaller traction motor gear (the pinion) on one end and the larger axle gear (the driven gear) on the other. The assembly is enclosed by a gear cover 21 which is a rounded wedge-shaped enclosure complete with grease seals for traction motor shaft and the axle shaft. (The gear cover 21 is shown schematically in FIG. 1.) The gear cover 21 thus contains a quantity of grease or lubricant for traction motor and wheel axle gears.

In accordance with the present invention, a steel probe tube 22 is inserted into the gear cover 21 and attached securely, such as by welding, bolting or clamping the tube to the inside of the gear cover. The lower end 23 of the tube 22 is open, and the tube is positioned so that the end 23 is at the lowest acceptable lubricant level. The upper end 24 of the tube 22 protrudes from the top of the gear cover 21. A flexible vacuum hose 25 is attached to the upper end 24 of the tube 22 with enough slack to allow full swiveling of the locomotive truck. Flexible vacuum hoses 25 are routed from each truck to a sensing and control chassis 26 located at any convenient location under the locomotive hood. Alternatively, the flexible hoses 25 may be used to connect the gear cover probe tubes 22 to the car body, and a solid tube may be used to connect the hoses 25 to the sensing and control chassis. It is vital that all connections between the tube 22 and the hose 25, and between the hose 25 and the solid tube on the car body, if any, be tight and sealed.

The hoses 25 from each of the gear covers on the locomotive are connected through a manifold 29 to the sensing and control chassis 26. In the sensing and control chassis 26, the manifold 29 is connected to a vacuum source 30, such as a pump, which is used to draw a partial vacuum from the hoses 25. The vacuum source 30 includes a vent 31 which is capable of venting all of the hoses 25. The vent 31 is closed when the vacuum source 30 is initiated. The vacuum source 30 is turned on and off by a vacuum source control 32, which contains suitable pneumatic or digital electronic logic. The vacuum source control 32 is, in turn, controlled by the output of an automatic lubricant level interrogator 33.

The input of the automatic lubricant level interrogator 33 is connected to the output of a time-out mechanism 35, such as a timer. The disable input for the timer 35 is connected by a port 36 to a locomotive motion detector 37. The motion detector 37 may be, for example, a proximity detector which is located adjacent to one of the locomotive wheels and which reads a magnet attached to the wheel to indicate that the locomotive is moving. A variety of other motion sensing devices are available and well known in the art, and may be suitable for use as the motion detector 37. The output of the automatic lubricant level interrogator 33 is also connected to the reset input of a second timer 38, so that the timer 38 is initiated at the same time as the vacuum source 30.

A vacuum pressure sensor 40 is also provided and connected to the manifold 29 to sense the vacuum pressure level in the manifold as created by the vacuum source 30. The vacuum sensor 40 is activated by the output of the timer 38. The vacuum sensor 40 provides an output signal indicating that the pressure level in the manifold has dropped below a predetermined level when the timer 38 has timed-out. The output signal of the vacuum sensor 40 is connected to the reset input of the timer 35.

The sensing and control chassis 26 includes a number of controls and displays which are provided at a convenient accessible location 42 for easy operation and inspection. These controls and displays may be located, for example, at the locomotive cab.

The controls include a manual actuator 43, such as a push button, to initiate a sensing operation without waiting for it to be initiated automatically. The controls also include a manual disable and reset switch 44 for stopping the automatic and continuous operation of the monitor for restarting the monitor after it has been disabled or shut down. The switch 44 is connected to the automatic lubricant level interrogator 33. The switch 44 acts to disable the automatic interrogator 33 and to enable it again. The reset switch 44 also acts to resume operation of the monitor after it has been automatically shut down due to a low lubricant level indication.

The display includes a lubricant level indicator 47 which provides either a low lubricant level indication ("LO") or an acceptable lubricant level indication ("OK"), and provides a ready indication ("ARMED") if the monitor is ready for manual activation. The indicator 47 is connected to the vacuum sensor 40, to the output of the timer 38 and to the output of the timer 35. The display may also include an indicator showing that the locomotive is at rest. Such an indicator would be connected to the locomotive motion detector 37 through the port 36.

Figure 2:
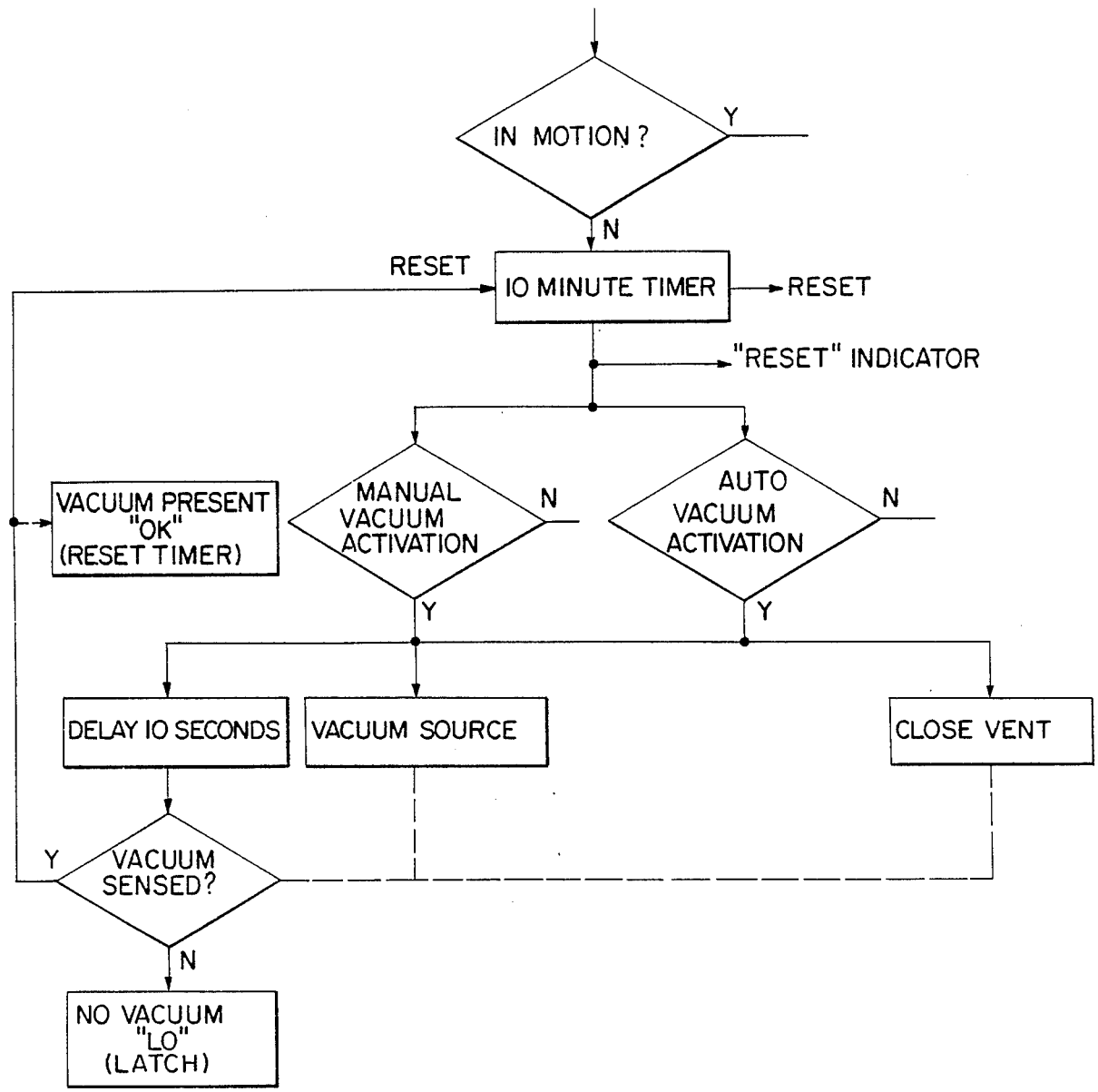
FIG. 2 is a flow-chart showing the program used with the monitor of FIG. 1.

The use of the lubricant level monitor of the present invention can be understood with reference to FIG. 2. The sensing and control chassis 26 is normally provided with a locomotive-in-motion signal from the locomotive motion detection input port 36. As previously noted, any of various zero speed sensing devices can be used and can be connected to the port 36. For example, a proximity detector may be located adjacent to one of the locomotive wheels and may read a magnet attached to the wheel.

As soon as there is no locomotive-in-motion signal received through the port 36, the time-out mechanism 35 stops receiving a reset signal and begins running. The timer 35 times out after a predetermined period, e.g., 10 minutes, indicating that the locomotive has been at rest for this period. In order to obtain an accurate measurement of lubricant level, the lubricant in the traction motor/axle gear covers 21 must be allowed to settle. Movement of the locomotive causes splashing and turbulent action of the lubricant in the gear covers, and such splashing and turbulence might result in a false "LO" indication. It has been found that 10 minutes is a suitable time to permit the lubricant levels in the gear covers 21 to stabilize.

After the timer 35 times out, the output of the timer 35 provides a signal to the lubricant level indicator 47 causing the indicator to display an "ARMED" indication, and provides an initiation input signal to the automatic lubricant level interrogator 33. The output of the automatic lubricant level interrogator 33 initiates the vacuum source control 32 to automatically activate the vacuum source 30. The vacuum source 30 closes the vent 31 and begins to draw a partial vacuum through all of the hoses 25 from the probe tubes 22 in all of the gear covers 21. The output of the automatic lubricant level interrogator 33 also initiates the timer 38, and the timer 38 begins running.

If the lubricant level in all of the gear covers 21 is above the acceptable low level, the open lower end 23 of each of the probe tubes 22 will be covered by lubricant, and the pressure within the hoses 25 will drop as the vacuum source 30 attempts to pull a vacuum. Eventually, the vacuum source 30 will attempt to draw lubricant through the hoses 25 to the vacuum source. However, the vacuum pressure sensor 40 prevents any appreciable amount of lubricant from being drawn through the hoses. The vacuum sensor 40 is set to a predetermined level to prevent lubricant to be drawn through the lines, 4 in-Hg being a reasonable pressure level to accomplish this purpose. When the vacuum sensor 40 is tripped, the vacuum sensor provides an output signal to the indicator 47 to display an "OK" indication, meaning that the lubricant level in all of the gear covers is acceptable. At the same time, the output signal from the vacuum sensor 40 is used as a reset input signal for the timer 35.

The output signal from the vacuum sensor 40 resets the time out mechanism 35, and the timer 35 again begins running. The timer 35 will then time out once more after the predetermined period, e.g., 10 minutes, and the output of the timer 35 will provide an initiation input signal to the automatic lubricant level interrogator 33 to again initiate the vacuum source control 32 to automatically activate the vacuum source 30, close the vent 31, begin to draw a partial vacuum through the hoses 25, and initiates the timer 38. In this manner, a lubricant level reading will be taken every 10 minutes as long as the locomotive remains at rest.

If the lubricant level in any one of the gear covers 21 is below the predetermined low level, the probe tube 22 in that gear cover will be open to the atmosphere. As the vacuum source 30 attempts to pull a vacuum in the system, the open probe tube will vent the system. When the timer 38 times-out after the predetermined interval, e.g., 10 seconds, and the pressure sensor 40 has not provided an output signal indicating that the predetermined vacuum pressure level has been achieved in the manifold, the timer 38 sends a signal to the lubricant level indicator 47 indicating the lack of proper vacuum, and the indicator 47 displays a "LO" indication in response. The timer 38 also sends a signal to the automatic interrogator 33 to stop further sensing. Thus, the "LO" indication effectively latches the system, and the monitor is shut down until the reset switch 44 in the sensing and control chassis 26 is engaged.

The monitor is activated automatically and operates continuously whenever the locomotive is at rest for at least 10 minutes. This assures that the lubricant levels will be constantly monitored whenever the locomotive is stopped. The manual disable and reset switch 44 is provided to avoid this automatic monitoring sequence if desired. The manual disable and reset switch 44 is connected to the automatic lubricant level interrogator 33 and acts to disable the interrogator and its functions. The automatic monitoring sequence can be resumed by re-engaging the reset switch 44.

A manual activation sequence is also provided and may be used whenever the "ARMED" signal is displayed by the indicator 47 and the locomotive has been at rest for the required period of time, e.g. 10 minutes, or longer. When the "ARMED" signal is displayed, the push-button actuator 43 may be depressed to initiate a manual lubricant level interrogator 50, without waiting for the full 10 minute cycle time of the timer 35 after the initial 10 minute "settling" period has occurred and the "ARMED" indication has been given. The manual interrogator 50 operates in a manner similar to the automatic interrogator 33 by activating the vacuum source control 32, which in turn, actuates the vacuum source 30 and closes the vent 31, and by initiating the timer 38. The monitoring sequence then continues as with the automatic sequence already described. If "ARMED" signal is not on, the manual lubricant level interrogator disables the push-button actuator 43, so that if the push-button actuator is depressed before the "ARMED" signal comes on, the monitoring sequence will not start, and neither a "LO" nor an "OK" indication will be given.

The gear cover lubricant level monitor of the present invention is preferably constructed using pneumatic logic wherever possible insure trouble-free operation. All of the functions of the above described elements can be provided by assembling appropriate pneumatic components as is well known in the pneumatic control art. The monitor can then operate entirely using a high-pressure pneumatic line without relying upon an electrical supply. It is desirable to employ a minimal amount of electrical devices since electrical supplies may be less reliable in the harsh environment in which the locomotive operates, while a pneumatic supply can be considered more reliable. However, it should be understood that the monitor of the present invention can be constructed of digital electronic components or of pneumatic components, and either are contemplated by the present invention.

While the monitor as presently described does not identify the particular gear cover or covers which has the low lubricant level, such information is not usually necessary. A locomotive would require a pit inspection if it were determined that any of the gear cover lubricant levels were low, and checking the lubricant level in all gear covers when the locomotive is pit inspected for any reason is a usual practice. Therefore, if the monitor produces a "LO" signal alarm, the mechanic must perform a pit inspection, and during this inspection, the mechanic can check the lubricant level in all of the gear covers to identify which requires servicing.

If, however, it is desired to provide information identifying which gear cover has a low lubricant level, the monitor of the present invention could be easily modified to provide such information by elimination of the manifold 29, and such modification would be within the skill of the art.

Other modifications are possible. For example, a replenishing feature could be added to the monitor of the present invention. Such a feature would detect the specific gear cover having a low lubricant level and subsequently meter the proper amount of lubricant necessary to replenish the gear cover from an on-board reservoir, so as to bring the lubricant in the gear cover to the correct operating level. Such metering devices are commercially and readily available, and the level monitoring system would merely trigger the metering sequence.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A system for monitoring the lubricant level in the gear covers of locomotives, comprising:
   means for detecting when the locomotive is in motion and when the locomotive is at rest;
   a timer connected to the detecting means for determining if the locomotive has been at rest for a predetermined period of time;
   a probe tube for extending into the gear cover, the probe tube having an open lower end, the lower end of the tube adapted to be positioned at a low lubricant level and to be covered with lubricant if the lubricant level is at or above the low lubricant level;
   a vacuum source connected to the probe tube for drawing a vacuum in the probe tube, the vacuum source being enabled by the timer to draw a vacuum only if the locomotive has been at rest for the predetermined period; and
   a vacuum sensor for determining if there is a partial vacuum in the probe tube, indicating that the probe tube is not vented and that the lubricant level is above the lower end of the tube.

2. A system for monitoring the lubricant level as defined in claim 1, comprising in addition a vent for venting the probe tube, and means for closing the vent when the vacuum source is enabled.

3. A system for monitoring the lubricant level as defined in claim 1, comprising a plurality of a probe tubes, each tube extending into one of the gear cover of the locomotive, all of the probe tubes being connected to the vacuum source.

4. A method for monitoring the lubricant level in the gear covers of locomotives, comprising the steps of:
   inserting into the gear cover a probe tube having an open lower end, and positioning the lower end of the tube at a low lubricant level such that the lower end will be covered with lubricant if the lubricant level is at or above the low lubricant level;

detecting when the locomotive is in motion and when the locomotive is at rest;

waiting a predetermined period of time after detecting that the locomotive is at rest;

drawing a vacuum in the probe tube only after the locomotive has been at rest for the predetermined period; and sensing if there is a partial vacuum in the probe tube, indicating that the probe tube is not vented and that the lubricant level is above the lower end of the tube.

5. A method for monitoring the lubricant level as defined in claim 4, comprising the additional step of drawing a vacuum in the probe tube at any time after the locomotive has been a rest for the predetermined period.

6. A method for monitoring the lubricant level as defined in claim 4, comprising the additional step of venting the probe tube except when drawing a vacuum.

7. A method for monitoring the lubricant level as defined in claim 4, comprising the additional step of using a plurality of probe tubes and inserting one probe tube into each gear cover of the locomotive.

8. A method for monitoring the lubricant level in the gear covers of locomotives, comprising the steps of:
inserting into the gear cover a probe tube having an open lower end, and positioning the lower end of the tube at a low lubricant level such that the lower end will be covered with lubricant if the lubricant level is at or above the low lubricant level;
determining if the locomotive is moving;
waiting a predetermined period of time after determining that the locomotive is at rest;
drawing a vacuum in the probe tube only after the locomotive has been at rest for the predetermined period;
sensing if there is a partial vacuum in the probe tube, indicating that the probe tube is not vented and that the lubricant level is above the lower end of the tube; and
waiting a second predetermined period of time after drawing the vacuum before sensing if there is a partial vacuum in the probe.

9. A method for monitoring the lubricant level in the gear covers of locomotives, comprising the steps of:
inserting into the gear cover a probe tube having an open lower end, and positioning the lower end of the tube at a low lubricant level such that the lower end will be covered with lubricant if the lubricant level is at or above the low lubricant level;
determining if the locomotive is moving;
waiting a predetermined period of time after determining that the locomotive is at rest;
drawing a vacuum in the probe tube only after the locomotive has been at rest for the predetermined period;
sensing if there is a partial vacuum in the probe tube, indicating that the probe tube is not vented and that the lubricant level is above the lower end of the tube; and
waiting the predetermined period of time immediately upon sensing if there is a partial vacuum in the probe tube, so that the method is continuously repeated as long as the locomotive is at rest.

10. A system for monitoring the lubricant level in the gear covers of locomotives, comprising:
a motion sensor for determining if the locomotive is moving;
a timer connected to the motion sensor for determining if the locomotive has been at rest for a predetermined period of time;
a probe tube for extending into the gear cover, the probe tube having an open lower end, the lower end of the tube adapted to be positioned at a low lubricant level and to be covered with lubricant if the lubricant level is at or above the low lubricant level;
a vacuum source connected to the probe tube for drawing a vacuum in the probe tube, the vacuum source being enabled by the timer to draw a vacuum only if the locomotive has been at rest for the predetermined period;
a vacuum sensor for determining if there is a partial vacuum in the probe tube, indicating that the probe tube is not vented and that the lubricant level is above the lower end of the tube; and
a second timer initiated by the first timer at the same time that the vacuum source is enabled, the second timer being operatively connected to the vacuum sensor to provide an indication that the lubricant level is below the lower end of the tube if the vacuum sensor has not determined that there is a partial vacuum in the probe tube after a second predetermined period of time.

11. A system for monitoring the lubricant level in the gear covers of locomotives, comprising:
a motion sensor for determining if the locomotive is moving;
a timer connected to the motion sensor for determining if the locomotive has been at rest for a predetermined period of time;
a probe tube for extending into the gear cover, the probe tube having an open lower end, the lower end of the tube adapted to be positioned at a low lubricant level and to be covered with lubricant if the lubricant level is at or above the low lubricant level;
a vacuum source connected to the probe tube for drawing a vacuum in the probe tube, the vacuum source being enabled by the timer to draw a vacuum only if the locomotive has been a rest for the predetermined period; and
a vacuum sensor for determining if there is a partial vacuum in the probe tube, indicating that the probe tube is not vented and that the lubricant level is above the lower end of the tube, the vacuum sensor re-initiating the timer to make an additional determination if there is a partial vacuum in the probe tube after the initial determination has been made.

12. A system for monitoring the lubricant level in the gear covers of locomotives, comprising:
a motion sensor for determining if the locomotive is moving;
a timer connected to the motion sensor for determining if the locomotive has been at rest for a predetermined period of time;
a probe tube for extending into the gear cover, the probe tube having an open lower end, the lower end of the tube adapted to be positioned at a low lubricant level and to be covered with lubricant if the lubricant level is at or above the low lubricant level;
a vacuum source connected to the probe tube for drawing a vacuum in the probe tube, the vacuum source being enabled by the timer to draw a vacuum only if the locomotive has been at rest for the predetermined period;

a vacuum sensor for determining if there is a partial vacuum in the probe tube, indicating that the probe tube is not vented and that the lubricant level is above the lower end of the tube; and a manual actuator for starting the vacuum source at any time after the timer has determined that the locomotive has been at rest for the predetermined period of time.

* * * * *

UNITED STATES PATENT AND TRADEMARK OFFICE
CERTIFICATE OF CORRECTION

PATENT NO. : 4,949,070
DATED : August 14, 1990
INVENTOR(S) : Donald C. Wetzel

It is certified that error appears in the above-identified patent and that said Letters Patent is hereby corrected as shown below:

Column 4, line 56, "initiates" should be --initiate--.

Column 6, line 60, "a probe" should be --probe--.

Column 6, line 61, "cover" should be --covers--.

Signed and Sealed this

Ninth Day of March, 1993

Attest:

STEPHEN G. KUNIN

Attesting Officer    Acting Commissioner of Patents and Trademarks